(12) United States Patent
Liang

(10) Patent No.: US 8,204,526 B2
(45) Date of Patent: *Jun. 19, 2012

(54) UNIFIED ADDRESSING

(75) Inventor: Robert Liang, Mississauga (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/035,323

(22) Filed: Feb. 25, 2011

(65) Prior Publication Data

US 2011/0143788 A1   Jun. 16, 2011

Related U.S. Application Data

(63) Continuation of application No. 11/313,813, filed on Dec. 22, 2005, now Pat. No. 7,904,099.

(51) Int. Cl.
*H04W 4/00* (2009.01)

(52) U.S. Cl. ............ 455/466; 455/41.2; 455/414.1; 455/418; 455/419; 455/420; 455/550.1; 370/310; 370/310.2; 370/312

(58) Field of Classification Search ............ 455/41.2, 455/414.1, 418–420, 466, 550.1; 370/310, 370/310.2, 312
See application file for complete search history.

(56) References Cited

U.S. PATENT DOCUMENTS

| | | | |
|---|---|---|---|
| 4,651,288 A | 3/1987 | Zeising | |
| 6,212,550 B1 | 4/2001 | Segur | |
| 6,421,707 B1 | 7/2002 | Miller et al. | |
| 6,424,828 B1 | 7/2002 | Collins et al. | |
| 6,570,596 B2 | 5/2003 | Frederiksen | |
| 6,597,918 B1 | 7/2003 | Kim | |
| 6,868,143 B1 | 3/2005 | Menon et al. | |
| 6,909,904 B2 | 6/2005 | Lehto et al. | |
| 6,948,130 B2 | 9/2005 | Long et al. | |
| 6,965,569 B1 | 11/2005 | Carolan et al. | |
| 7,076,657 B2 | 7/2006 | Koukoulidis et al. | |
| 7,181,231 B2 | 2/2007 | Le Bodic et al. | |
| 7,185,285 B2 | 2/2007 | Van Dok et al. | |
| 7,254,411 B2 | 8/2007 | Cheng et al. | |
| 7,272,634 B2 | 9/2007 | Clement et al. | |
| 7,515,903 B1 | 4/2009 | Cast | |
| 7,617,287 B2 | 11/2009 | Vella et al. | |
| 2002/0152220 A1 | 10/2002 | Kang et al. | |
| 2002/0160757 A1 | 10/2002 | Shavit et al. | |
| 2003/0104827 A1 | 6/2003 | Moran et al. | |
| 2004/0185883 A1 | 9/2004 | Rukman | |

(Continued)

FOREIGN PATENT DOCUMENTS

WO    WO01/99341    12/2001

OTHER PUBLICATIONS www.oskarmobil.cz/en/services/sending/php pub/print date Jan. 3, 2005.

(Continued)

*Primary Examiner* — Steve D Agosta

(57) ABSTRACT

An outgoing message composed on a mobile wireless communication device may be recognized as including a Short Messaging Service (SMS) destination address in an addressing field. The outgoing message may then be processed to create a SMS message payload. The SMS message payload may then be passed to a SMS client application executed on the wireless communication device with an indication of the SMS destination address so that the SMS client application may form an SMS message based on the SMS message payload and the indication of the SMS destination address.

10 Claims, 5 Drawing Sheets

```
To: bob@smith.com
cc: johnq@public.com; (416)555-1212
Subject: Yesterday's teleconference Hi Bob, Further to yesterday's teleconference, I would
like to set up a meeting with you and John to
go over the final figures before the
presentation on Friday.

When is a good time for you?

Regards,
Carol.
```

U.S. PATENT DOCUMENTS

2006/0009243 A1  1/2006  Dahan et al.
2006/0036695 A1  2/2006  Rolnik

OTHER PUBLICATIONS www.ipipi.com/help/helpsms_email.htm pub/print Jan. 1, 2006.
European Telecommunication Standard Institute, Digital Cellular Telecommunications system (Phase 2); Point-to-point (PP) Short Message Service (SMS) support on mobile radio interface (GSM 04.11), Sep. 1996, Fourth Edition, 1996.
D'Agosta, Stephen M. USPTO Office Communication issued Jul. 20, 2010, in relation to U.S. Appl. No. 11/313,813, filed Dec. 22, 2005.
D'Agosta, Stephen M. USPTO Office Communication issued Jan. 7, 2010, in relation to U.S. Appl. No. 11/313,813, filed Dec. 22, 2005.
D'Agosta, Stephen M. USPTO Office Communication issued Aug. 31, 2009, in relation to U.S. Appl. No. 11/313,813, filed Dec. 22, 2005.
D'Agosta, Stephen M. USPTO Office Communication issued Jun. 17, 2009, in relation to U.S. Appl. No. 11/313,813, filed Dec. 22, 2005.
D'Agosta, Stephen M. USPTO Office Communication issued Mar. 13, 2009, in relation to U.S. Appl. No. 11/313,813, filed Dec. 22, 2005.
D'Agosta, Stephen M. USPTO Office Communication issued Dec. 12, 2008, in relation to U.S. Appl. No. 11/313,813, filed Dec. 22, 2005.

UNIFIED ADDRESSING

CROSS-REFERENCE TO RELATED APPLICATION

This application is a continuation of application Ser. No. 11/313,813 filed on Dec. 22, 2005, now U.S. Pat. No. 7,904,099, issued on Mar. 8, 2011, the contents of which are hereby incorporated by reference.

FIELD OF THE INVENTION

The present application relates to electronic messaging and, in particular, the handling of an outgoing message so that the outgoing message may be sent to users of more than one message handling service.

BACKGROUND

Current mobile wireless communication devices provide features beyond basic wireless telephony that include an ability to send and receive Short Message Service (SMS) messages, an ability to send and receive e-mail messages and an ability to browse online information formatted using either the known Wireless Application Protocol (WAP) or the known Hyper-Text Transfer Protocol (HTML).

Each of the features is typically implemented in a separate client application executed on the wireless communication device. To implement the features outlined above as examples, an exemplary wireless communication device may require an SMS client application, an e-mail client application, a WAP browsing application and an HTML browsing application.

Unfortunately, when a user of the exemplary wireless communication device is intent on sending the same message to a first recipient associated with an e-mail address and a second recipient associated with a telephone number of a device capable of receiving SMS messages (an SMS destination address), the user is required to separately compose the message in the e-mail client application and send the message to the first recipient associated with the e-mail address and compose the same message in the SMS client application and send the message to the second recipient associated with the SMS destination address.

BRIEF DESCRIPTION OF THE DRAWINGS

In the figures which illustrate example embodiments of this application.

DETAILED DESCRIPTION

Figure 1:
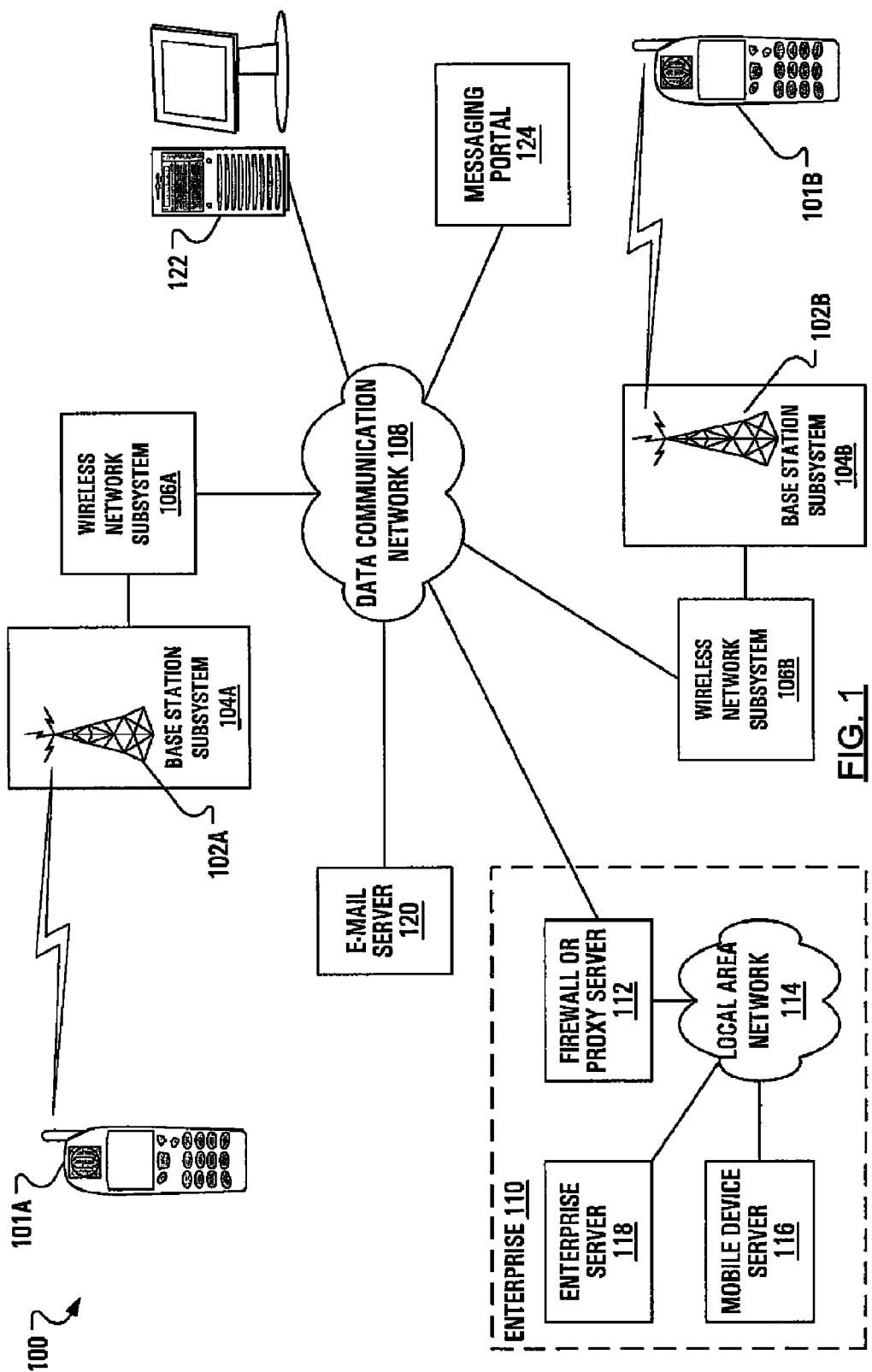
FIG. 1 illustrates components of an exemplary mobile data communication device according to an embodiment of the present application.

An e-mail client application executed on a wireless communication device may be configured to allow an e-mail message to be addressed to both an SMS destination address and an e-mail address in any of the address fields. The e-mail client application may process the e-mail message to form an SMS message payload and pass the SMS message payload, along with addressing information, to an SMS client application executed on the same wireless communication device. The SMS client application may then handle the formulation of an SMS message based on the SMS message payload and the SMS destination address. The SMS client application may also handle the delivery of the SMS message to the associated wireless network while the e-mail application handles the conventional delivery of the e-mail message to the associated wireless network. In this manner, the same message may be sent to recipients assumed to be associated with devices with full featured e-mail clients and recipients assumed to be associated with devices with limited text messaging capabilities. Advantageously, the user experience is enhanced in that the message need only be composed once.

In accordance with an aspect of the present application there is provided a method of handling an outgoing message. The method includes, where the outgoing message is formatted for a first message handling service, determining that the outgoing message is associated with a first destination address for the first message handling service, determining that the outgoing message is associated with a second destination address for a second message handling service, processing the outgoing message to create a message payload for the second message handling service and passing the message payload to a client application for the second message handling service with an indication of the second destination address. In other aspects of the application, a communication device is provided, with a processor adapted to perform this method, and a computer readable medium is provided to adapt a communication device to perform this method.

In accordance with another aspect of the present application there is provided a method of controlling a message composition interface on a mobile communication device. The method includes presenting the message composition interface to a user of the mobile communication device, receiving input from the user, creating a being-composed message based on the input, recognizing that the being-composed message includes a Short Messaging Service destination address in an addressing field and displaying a marker in the message composition interface to indicate a point in the being-composed message at which the message will be truncated for sending as a Short Messaging Service message payload.

In accordance with a further aspect of the present application there is provided a method of handling an outgoing message. The method includes, where the outgoing message is formatted for a first message handling service, determining that the outgoing message is associated with a first destination address for the first message handling service, determining that the outgoing message is associated with a second destination address for a second message handling service and passing the outgoing message to a client application for the second message handling service with an indication of the second destination address.

Other aspects and features of the present application will become apparent to those of ordinary skill in the art upon review of the following description of specific embodiments of the application in conjunction with the accompanying figures.

FIG. 1 illustrates elements of an exemplary network environment 100 for a first wireless mobile communication device 101A. The elements of the exemplary network environment 100 include multiple wireless carrier networks and a data communication network 108, which may be considered to represent at least one wide area network, such as the present day Internet and successors, as well as, potentially, multiple local area networks. A first base station antenna 102A, with which the first wireless mobile communication device 101A may communicate wirelessly, is provided as part of a first base station subsystem 104A.

The first base station subsystem 104A connects to a first wireless network subsystem 106A. In an exemplary Global System for Mobile communications (GSM) implementation, the first wireless network subsystem 106A includes, among other components, a mobile services switching center, a home location register, a visitor location register, a relay and a Short Messaging Service Center (SMSC). As illustrated in FIG. 1, the first wireless network subsystem 106A is connected to the data communication network 108.

Also connected to the data communication network 108 is a second wireless network subsystem 1068. Similar to the first wireless network subsystem 106A, the second wireless network subsystem 106B may include a mobile services switching center, a home location register, a visitor location register, a relay and an SMSC. The second wireless network subsystem 106A connects to a second base station subsystem 104B with a second base station antenna 102B. The second base station antenna 102B may allow the second base station subsystem 104B to communicate wirelessly with a second mobile device 101B.

The first mobile device 101A may be associated with an enterprise 110 connected to the data communication network 108. The enterprise 110 may, for instance, include a firewall or proxy server 112 connecting to the data communication network 108 and to a local area network (LAN) 114. The LAN 114 may allow communication between a mobile device server 116 and an enterprise server 118.

Also connected to the data communication network 108 may be an e-mail server 120 and a desktop computer 122, which may be associated with a user having an account on the e-mail server 120. Also connected to the data communication network 108 may be a messaging portal 124.

Figure 2:
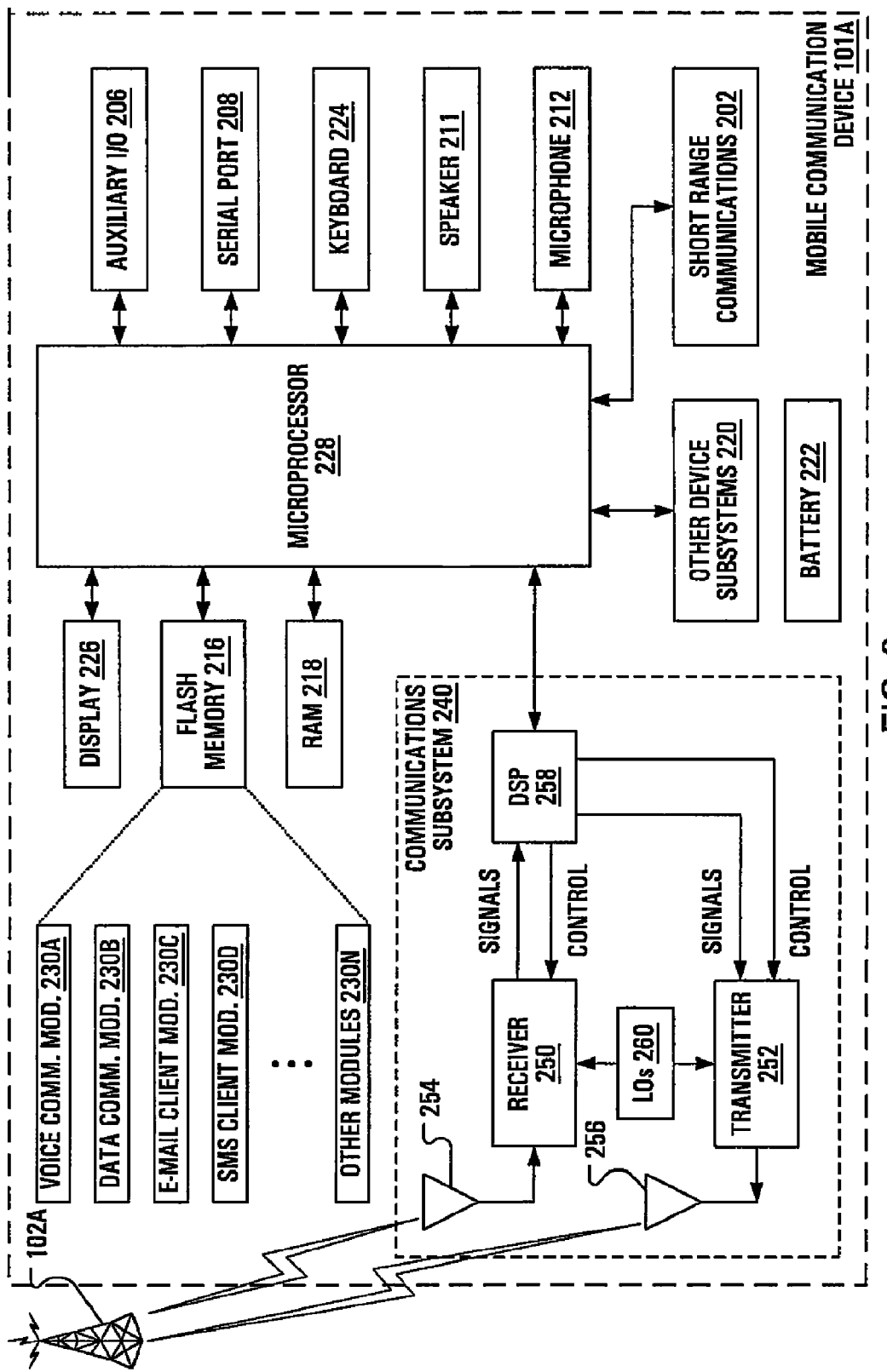
FIG. 2 illustrates elements of an exemplary wireless carrier network in communication with a public switched telephone network.

FIG. 2 illustrates the first wireless mobile communication device 101A including a housing, an input device (a keyboard 214), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 214 and the display 226. The microprocessor 228 controls the operation of the display 226, as well as the overall operation of the first mobile device 101A, in response to actuation of keys on the keyboard 214 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the first mobile device 101A are shown schematically in FIG. 2. These include: a communications subsystem 240; a short-range communications subsystem 202; the keyboard 214 and the display 226, along with other input/output devices including a set of auxiliary I/O devices 206, a serial port 208, a speaker 211 and a microphone 212; as well as memory devices including a flash memory 216 and a Random Access Memory (RAM) 218; a battery 222; and various other device subsystems 220. The first mobile device 101A is preferably a two-way radio frequency (RF) communication device having voice and data communication capabilities. In addition, the first mobile device 101A preferably has the capability to communicate with other computer systems via the Internet.

Operating system software executed by the microprocessor 228 is preferably stored in a computer readable medium, such as the flash memory 216, but may be stored in other types of memory devices; such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enablesexecution of software applications on the first mobile device 101A. A predetermined set of software applications that control basic device operations, such as a voice communications module 230A and a data communications module 230B, may be installed on the first mobile device 101A during manufacture. An e-mail client application module 230C may also be installed on the first mobile device 101A during manufacture, to implement aspects of the application. Additionally, an SMS client application module 230D may also be installed on the first mobile device 101A during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the first base station antenna 102A. Preferably, the data items managed by the PIM application are seamlessly integrated, synchronized and updated via the wireless carrier network with the device user's corresponding data items stored or associated with a host computer system.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the first mobile device 101A is intended to operate. For example, the communication subsystem 240 of the first mobile device 101A may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the first mobile device 101A.

When required network registration or activation procedures have been completed, the first mobile device 101A may send and receive communication signals over the wireless carrier network. Signals received from the first base station antenna 102A by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102A are processed (e.g., modulated and encoded) by the DSP 258 and are then provided to the transmitter 252 for digital to analog conversion, frequency up conversion, filtering, amplification and transmission to the first base station antenna 102A via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 214 and/or some other auxiliary I/O device 206, such as a touch-pad, a rocker switch, a thumb-wheel, or some other type of input device. The composed data items may then be transmitted to the base station antenna 102A via the communication subsystem 240.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the first mobile device 101A. In addition, the display 226 may also be utilized in voice communication mode, for example, to display the identity of a calling party, the duration of a voice call, or other voice call related information.

The short-range communications subsystem 202 enables communication between the first mobile device 101A and other proximate systems or devices, which need not necessarily be similar devices. For example, the short-range communications subsystem 202 may include an infrared device and associated circuits and components, or a Bluetooth™ communication module, to provide for communication with similarly-enabled systems and devices.

Figure 3:
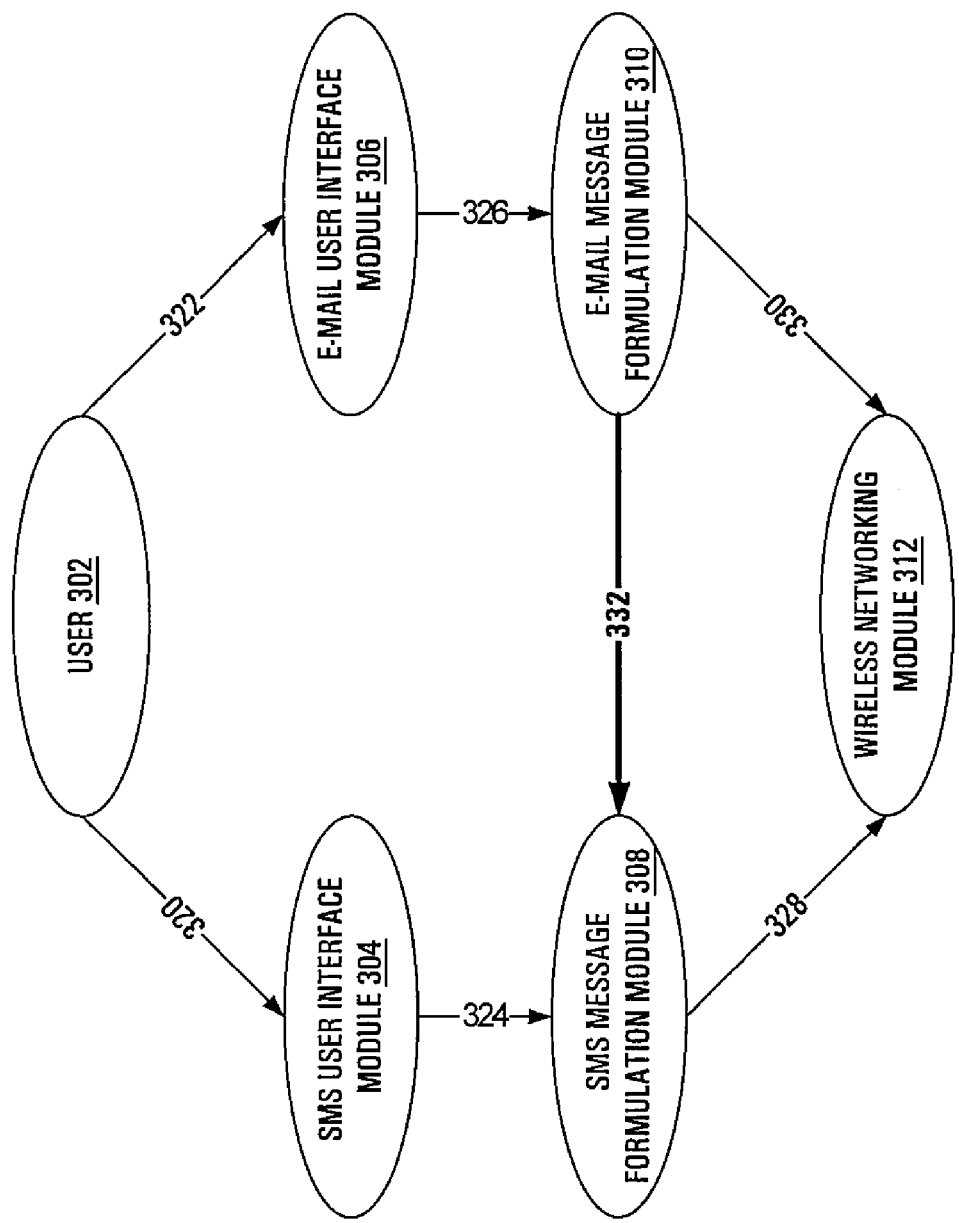
FIG. 3 illustrates a high level overview of message flow according to an embodiment of the present application.

An SMS message Protocol Data Unit (PDU) includes a payload, routing data and other metadata. In typical SMS messaging operation, illustrated at a high level in FIG. 3, a user 302 of the first mobile device 101A may employ (reference link 320) a user interface module 304 of the SMS client application to compose an SMS message (i.e., compose the payload). The user may address the SMS message by directly entering a telephone directory number (i.e., an SMS destination address) of an SMS-capable entity (say, the second mobile device 101B) in an addressing field presented as part of the user interface of the SMS client application. Alternatively, the user may select a contact from within a user interface presented by the PIM application. Once the contact is selected, the PIM user interface may allow the user to specify an instruction to begin composition of an SMS message payload for sending to the contact The PIM application may then trigger the SMS client application to open an SMS message composition interface provided by the SMS user interface module 304 with an SMS destination address of an SMS-capable entity associated with the contact pre-loaded in the addressing field.

When the user has completed composition of the SMS message payload, the user may indicate, through use of the SMS client interface, that the SMS message payload is complete and should be sent. The SMS user interface module 304, in response, may pass (reference link 324) the composed SMS message payload and addressing information to a SMS message formulation module 308 to formulate a standard-compliant SMS message based on the composed SMS message payload and addressing information. The SMS message formulation module 308 may then arrange (reference link 328) the transmission of the SMS message to the first base station antenna 102A via the communication subsystem 240 by a wireless networking module 312.

The SMS message received at the first base station antenna 102A may be later received at the mobile services switching center in the first wireless network subsystem 10SA. From the mobile services switching center, the SMS message may be sent to the SMSC, which may also be in the first wireless network subsystem 106A. The SMSC may arrange the delivery of the SMS message to the second mobile device 101B via the data communication network 108, the second wireless network subsystem 106B and the second base station subsystem 104B.

Normally, only a single SMS destination address is allowed per SMS message. However, SMS destination address aliases may be configured to represent multiple SMS destination addresses. An SMS message payload addressed to an SMS destination address alias may cause the SMS client application to employ the communication subsystem 240 to send the same SMS message payload multiple times, once for each SMS destination address to which the SMS destination address alias corresponds.

In typical e-mail messaging operation, the user 302 of the first mobile device 101A may employ (reference link 322) an e-mail user interface module 306 of the e-mail client application to compose an e-mail message body. The user may address the e-mail message body by directly entering an e-mail address of a contact (say, the user having an account on the e-mail server 120) in an addressing field presented as part of the user interface of the e-mail client application. Alternatively, the user may select a contact from within a user interface presented by the PIM application. Once the contact is selected, the PIM user interface may allow the user to specify an instruction to begin composition of an e-mail message body to be sent to the contact. The PIM application may then trigger the e-mail client application to open an e-mail message composition interface provided by the e-mail user interface module 306 with an e-mail address associated with the contact pre-loaded in one of the addressing fields.

When the user has completed composition of the e-mail message body, the user may indicate, through use of the e-mail user interface module 306, that the e-mail message body is complete and should be sent. The e-mail user interface module 306, in response, may pass (reference link 326) the composed body and addressing information to an e-mail message formulation module 310 to formulate a standards-compliant e-mail message based on the composed body and addressing information. The e-mail message formulation module 310 may then arrange (reference link 330) the transmission of the e-mail message to the first base station antenna 102A via the communication subsystem 240 by the wireless networking module 312.

The e-mail message received at the first base station antenna 102A may be later received at the relay in the first wireless network subsystem 106A. From the relay, the e-mail message may be sent to the mobile device server 116 via the data communication network 108, the firewall 112 and the LAN 114. The mobile device server 116 may then forward the e-mail message to the enterprise server 118 at which the delivery of the e-mail message to the e-mail server 120 via the data communication network 108 may be arranged. Finally, an e-mail client executed on the desktop computer 122 associated with the user having an account on the e-mail server 120 may communicate with the e-mail server 120 to retrieve the e-mail message.

In contrast to an SMS message payload, a given e-mail message body may be addressed to multiple recipients without the use of an alias. Addressing fields available to the e-mail message composition interface often include a "TO:" field for indicating addresses of primary recipients, a "CC:" field for indicating addresses of secondary recipients and a "BCC:" field for indicating addresses of recipients to be kept secret from the other recipients. Additionally, an e-mail message may be further distinguished from an SMS message in that, unlike an SMS message, an e-mail message includes a "SUBJECT:" field.

In overview, the e-mail message formulation module 310 on the first mobile device 101A may be configured to determine that one or more SMS destination addresses have been included in the addressing information received from the e-mail user interface module 306. When a given message composed as an e-mail message and addressed to at least one SMS destination address is to be sent, the e-mail message formulation module 310 may pass (reference link 322) all or part of the given message to the SMS message formulation module 308 so that the SMS message formulation module 308 may arrange (reference link 328) the transmission of an SMS message, based on all or part of the given message, to the at least one SMS destination address. As such, all or part of a message composed as an e-mail message may be transmitted to an SMS destination address, thereby obviating a requirement to compose and send the same message twice when sending a single message to one recipient associated with an SMS destination address and another recipient associated with an e-mail address.

Figure 4:
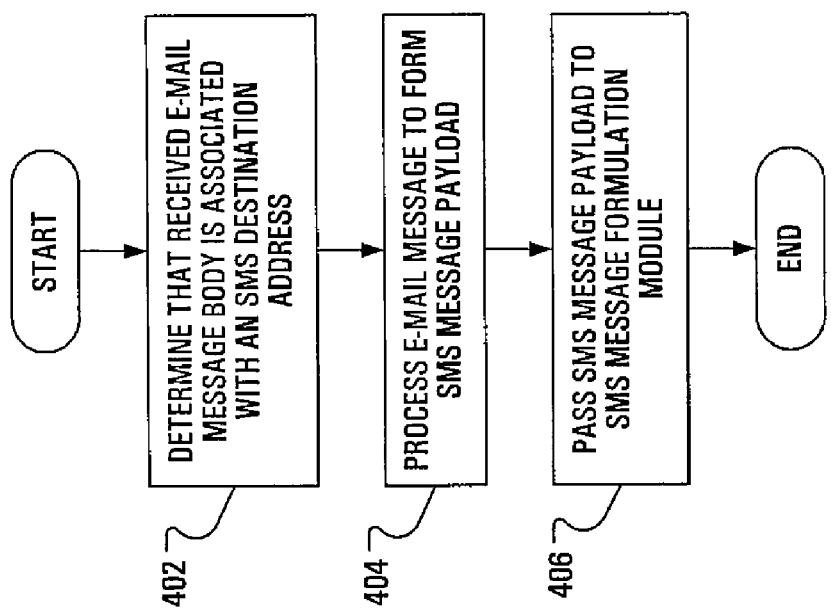
FIG. 4 illustrates steps in an exemplary method of handling an outgoing message according to an embodiment of the present application.

FIG. 4 illustrates one aspect of operation, wherein the e-mail message formulation module 310 of the e-mail client application determines (step 402) that at least one SMS destination address has been included among the addressing information associated with a given e-mail message body (and subject). An SMS destination address may be determined as having been included among the addressing information through the recognition that a destination address has no "@" symbol and consists only of digits. The e-mail message formulation module 310 may process the given e-mail message body (step 404) before passing (step 406) one or more portions of the given message to the SMS message formulation module 308 of the SMS client application as SMS message payloads associated with an SMS destination address.

Current GSM SMS standards allow for no more than 160 characters per SMS message, while current TDMA and CDMA networks allow 200 characters per SMS message. In the GSM case, the SMS message payload is standardized as 140 bytes: either 160 7-bit characters, 140 8-bit characters or 70 2-byte characters in languages such as Chinese, Korean, or Japanese when encoded using 2-byte UTF-16 character encoding.

As such, the processing (step 404) performed by the e-mail message formulation module 310 may involve creating an SMS message payload by truncating the body of a composed e-mail message. Optionally, the SMS message payload may include the text of the subject of the composed e-mail message as the first characters of the SMS message payload. The remaining characters of an SMS message payload created to include the text of the subject of the composed e-mail message would be representative of the first characters of the body of the composed e-mail message included in the SMS message payload until the limit of characters is reached. Notably, the SMS message payload may be devoid of addressing information.

Once the processing (step 404) of the e-mail message to form an SMS message payload is complete, the e-mail message formulation module 310 may pass (step 406) the SMS message payload, along with an indication of the SMS destination address, to the SMS message formulation module 308. In the case wherein more than one SMS destination address has been specified in the addressing information included with the e-mail message body received by the e-mail message formulation module 310 from the e-mail user interface module 306, the e-mail message formulation module 310 may send the SMS message payload paired with an SMS destination address to the SMS message formulation module 308 once for each SMS destination address.

Since the SMS message payload sent to the SMS message formulation module 308 from the e-mail message formulation module 310 may be limited to a given number of characters, when the e-mail user interface module 306 determines that an SMS destination address has been included in at least one of the addressing fields, the e-mail user interface module 306 of the e-mail client application may insert a marker in a display of the being-composed e-mail message body to indicate the point in the being-composed e-mail message body at which the character limit has been reached. The marker may be interpreted by the user as indicating the extent of the text to be sent to the SMS destination address.

Figure 5:
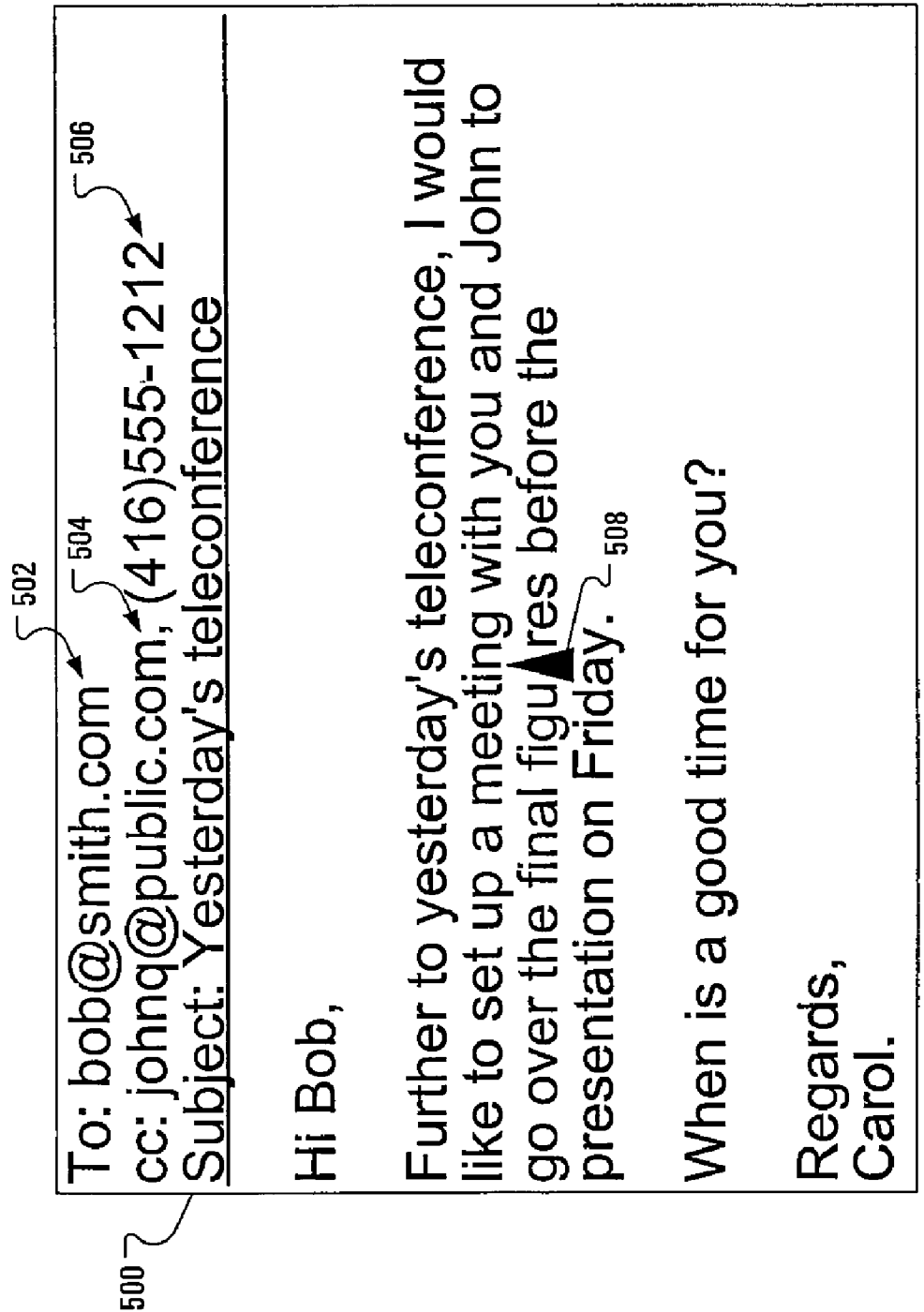
FIG. 5 illustrates an exemplary e-mail message composition user interface according to an embodiment of the present application.

FIG. 5 illustrates an exemplary e-mail message composition user interface 500. Notably, the being-composed e-mail message has been provided with a first e-mail address 502 in a "To:" addressing field. In a "cc:" addressing field, the being-composed e-mail message has been provided with a second e-mail address 504 and an SMS destination address 506. Upon determining that an SMS destination address has been included in the "cc:" addressing field, the e-mail user interface module 306 has inserted a marker 508 in the e-mail message composition user interface 500 to indicate the point in the being-composed e-mail message body at which the character limit has been reached. As will be understood by person of ordinary skill in the art, the character limit is dependent upon the standard in use by the device executing the e-mail user interface module that is presenting the e-mail message composition user interface 500.

It is known, in some wireless device-based e-mail client applications, to add a signature to the body of an outgoing composed e-mail message, where a signature may include a few lines of text relating to contact information for the sender. Such contact information may, for instance, include text indicating a name, organization, one or more e-mail addresses and one or more telephone numbers.

A situation may exist wherein a composed e-mail message body to be sent includes fewer characters than the character limiting number. As such, the sender may not witness a marker in the e-mail message composition interface. However, the e-mail message formulation module 310 may insert, into the SMS message payload to be transferred to the SMS message formulation module 308, as much of the signature text as will fit given the text to be transmitted (e.g., subject, body) and the character limit.

SMS client applications are known to exist that allow the construction of a "macro" SMS message with more characters than are allowed in a standard SMS message. In a macro SMS message composition interface, a user may not be required to stop composing when the standard character-limit is reached. Instead the user is allowed to continue composing until a macro SMS message has been composed. When arranging for the transmission of the macro SMS message, the SMS client application may break up the macro SMS message into portions, where each portion has no more characters than the character-limit. A mobile device receiving the multiple portions may recognize the portions' relationship to each other and may recreate the macro SMS message by concatenating the portions received as separate SMS messages for presentation to the user.

As an alternative to the passing, by the e-mail message formulation module 310, of a single SMS message payload based on a composed e-mail message body to the SMS message formulation module 308, the e-mail message formulation module 310 may send multiple SMS message payloads based on the body of the composed e-mail message to the SMS message formulation module 308 along with an indication of the SMS destination address. The SMS message formulation module 308 may simply transmit multiple standard-sized SMS messages, each one carrying one of the multiple SMS message payloads. Ideally, the Short Message Entity that corresponds to the SMS destination address has the capability to form a macro SMS message from multiple standard-sized SMS messages and can, therefore, generate the composed e-mail message body.

Even where the Short Message Entity that corresponds to the SMS destination address does not have the capability to form a macro SMS message from multiple standard-sized SMS messages, the text of the composed e-mail message will still be received at the Short Message Entity, but may only be reviewed by the user as multiple portions.

To facilitate the e-mail message formulation module 310 deciding between passing, to the SMS message formulation module 308, just a single SMS message payload or multiple SMS message payloads representative of a composed e-mail message, a field may be present in the contact management application of the PIM. A user may manually indicate in the field whether a device associated with an SMS destination address associated with a particular contact is capable of reassembling a macro SMS message from multiple standard-sized SMS messages.

When the e-mail message formulation module 310 has decided to transmit multiple SMS message payloads representative of a single e-mail message to the SMS message formulation module 308, the e-mail message formulation module 310 may insert markers in the display of the being-composed e-mail message body to indicate additional truncation points in the being-composed e-mail message body at which the character limit of SMS messages, subsequent to the initial SMS message, has been reached. Alternatively, in recognition of the macro SMS message, the e-mail message formulation module 310 may refrain from inserting markers in the display of the being-composed e-mail message body.

It is common for an e-mail message to include, in the addressing fields, the many e-mail addresses to which the e-mail message is intended. A receiver of an e-mail message may, therefore, review a list of intended recipients for the e-mail message (except those e-mail addresses for recipients specified in the BCC: field, if any). The inclusion of such information allows a recipient to "Reply to All" when replying to the received e-mail message such that the e-mail client application populates the addressing fields with the contents of the addressing fields of the received e-mail message.

Even though the one or more SMS destination addresses specified by a user of a mobile device executing aspects of the application are used by the e-mail client application to instruct the SMS client application, it is expected that the e-mail client application will not remove the one or more SMS destination addresses from the addressing fields before transmitting the e-mail message in the usual manner. While the e-mail client application need not attempt to send to the one or more SMS destination addresses, the one or more SMS destination addresses may be useful to an e-mail message recipient's e-mail client application, where the recipient's e-mail client application has the same or similar SMS addressing capabilities as the sender's e-mail client application. Additionally, an e-mail message recipient may recognize an SMS destination address in an addressing field of a received e-mail message as associated with a particular recipient.

Unfortunately, the addressing information received associated with an SMS message may be limited to the SMS destination address of the Short Messaging Entity that was the origin of the SMS message.

Rather than being executed at the first mobile device 101A, an e-mail client application having SMS addressing capabilities may be executed at the desktop computer 122. The enterprise server 118 may receive, from the e-mail client application executed at the desktop computer 122, an outgoing e-mail message addressed to at least one e-mail address as well as to at least one SMS destination address. The enterprise server 118 may handle the transmission of the e-mail message to the at least one e-mail address and, additionally, may perform aspects of the application to recognize that the outgoing e-mail message is associated with an SMS destination address, process the outgoing message to create an SMS message payload and pass the SMS message payload, via the data communication network 108, to an SMS client application that is executed on the messaging portal 124. The SMS client application may then send the SMS payload to the SMS destination address.

Equally, the enterprise server 118 may recognize that the outgoing e-mail message is associated with an SMS destination address and may pass the entire outgoing e-mail message (addressing fields, subject, body), via the data communication network 108, to an SMS client application that is executed on the messaging portal 124. The SMS client application may then process the outgoing e-mail message to form an SMS message payload and send the SMS payload to the SMS destination address.

Alternatively, an e-mail client application having SMS addressing capabilities may be executed at the messaging portal 124 (FIG. 1). The messaging portal 124 may, for instance, present a Hyper-Text Markup Language-based (HTML-based) interface, over the data communication network 108, to a user at the desktop computer 122. Using the HTML-based interface, the user may compose an outgoing e-mail message and address the message to at least one e-mail address as well as at least one SMS destination address. The e-mail client application executed on the messaging portal 124 may then, as described above in conjunction with a description of the activities of the first mobile device 101A, perform aspects of the application to determine that the outgoing e-mail message is associated with an SMS destination address, process the outgoing message to create an SMS message payload and pass the SMS message payload to an SMS client application that is also executed on the messaging portal 124.

Again, the e-mail client application executed on the messaging portal 124 may pass the entire e-mail message (addressing fields, subject, body) to the SMS client application executed on the messaging portal 124. The SMS client application may then process the e-mail message to form the SMS message payload and send the SMS payload to the SMS destination address.

As should be clear to a person of ordinary skill in the art, rather than the e-mail message formulation module 310 processing a composed e-mail message to form an SMS message payload and subsequently passing the SMS message payload, along with an indication of the SMS destination address, to the SMS message formulation module 308, the e-mail message formulation module 310 may pass the entire e-mail message (addressing fields, subject, body) to the SMS message formulation module 308. The SMS message formulation module 308 may then process the e-mail message to form the SMS message payload and send the SMS payload to the SMS destination address.

Other modifications will be apparent to those skilled in the art and, therefore, the invention is defined in the claims.

I claim:

1. A method of handling an outgoing message in a mobile communication device, said method comprising:
   presenting a message composition interface for creating a being-composed message;
   recognizing that said being-composed message comprises a Short Messaging Service (SMS) destination address in an addressing field;
   determining whether a device associated with said SMS destination address is capable of concatenating multiple SMS message payloads;
   during composition of said being-composed message, displaying a marker in said message composition interface to indicate a point in said being-composed message at which a character limit has been met if said device associated with said SMS destination address is incapable of said concatenating;
   permitting editing of said being-composed message while displaying said marker; and
   transmitting said being-composed message as a macro SMS message where the device associated with said SMS destination address is capable of said concatenating, or, as multiple SMS message payloads where the device associated with said SMS destination address is not capable of said concatenating;
   and further comprising:
   where said message is formatted for an email message handling service, determining that said message is associated with a first destination address for said email message handling service;
   determining that said message is associated with a second destination address for said SMS; and
   passing said message to a SMS client application on said mobile communication device for said SMS with an indication of said second destination address;
   and wherein said SMS destination address is a first SMS destination address and further comprising:
   determining that said message is associated with a second SMS destination address; and
   passing first and second SMS message payloads of said multiple SMS message payloads to said SMS client application with an indication of said second SMS destination address.

2. A method of handling an outgoing message in a mobile communication device, said method comprising:
   presenting a message composition interface for creating a being-composed message;
   recognizing that said being-composed message comprises a Short Messaging Service (SMS) destination address in an addressing field;
   determining whether a device associated with said SMS destination address is capable of concatenating multiple SMS message payloads;
   during composition of said being-composed message, displaying a marker in said message composition interface to indicate a point in said being-composed message at which a character limit has been met if said device associated with said SMS destination address is incapable of said concatenating;
   permitting editing of said being-composed message while displaying said marker; and
   transmitting said being-composed message as a macro SMS message where the device associated with said SMS destination address is capable of said concatenating, or, as multiple SMS message payloads where the device associated with said SMS destination address is not capable of said concatenating;
   and further comprising:
   where said message is formatted for an email message handling service, determining that said message is associated with a first destination address for said email message handling service;
   determining that said message is associated with a second destination address for said SMS; and
   passing said message to a SMS client application on said mobile communication device for said SMS with an indication of said second destination address;
   and further comprising formulating a first SMS message based on a first SMS message payload of said multiple SMS message payloads and said SMS destination address and formulating a second SMS message based on a second SMS message payload of said multiple SMS message payloads and said SMS destination address.

3. The method of claim 2 further comprising transmitting said first and said second SMS messages on a wireless network.

4. A communication device comprising a processor adapted to:
   present a message composition interface for creating a being-composed message;
   populate fields of said message composition interface based on user input;
   recognize that said being-composed message comprises a Short Messaging Service (SMS) destination address in an addressing field;
   determine whether a device associated with said SMS destination address is capable of concatenating multiple SMS message payloads;
   during composition of said being-composed message, display a marker in said message composition interface to indicate a point in said being-composed message at which a character limit has been met if said device associated with said SMS destination address is incapable of said concatenating;
   display another marker in a text field to indicate another point in said being-composed message at which a further character limit has been met such that text between said marker and said another marker will be sent as one SMS message payload;
   permit editing of said being-composed message while displaying said marker; and transmit said being-composed message as a macro SMS message where the device associated with said SMS destination address is capable of said concatenating, or, as multiple SMS message payloads where the device associated with said SMS destination address is not capable of said concatenating.

5. A tangible and non-transitory computer readable medium having stored thereon computer-executable instructions that, when performed by a processor in a communication device, cause said processor to:
present a message composition interface for creating a being-composed message;
populate fields of said message composition interface based on user input;
recognize that said being-composed message comprises a Short Messaging Service (SMS) destination address in an addressing field;
determine whether a device associated with said SMS destination address is capable of concatenating multiple SMS message payloads;
during composition of said being-composed message, display a marker in said message composition interface to indicate a point in said being-composed message at which a character limit has been met if said device associated with said SMS destination address is incapable of said concatenating;
display another marker in a text field to indicate another point in said being-composed message at which a further character limit has been met such that text between said marker and said another marker will be sent as one SMS message payload;
permit editing of said being-composed message while displaying said marker; and
transmit said being-composed message as a macro SMS message where the device associated with said SMS destination address is capable of said concatenating, or, as multiple SMS message payloads where the device associated with said SMS destination address is not capable of said concatenating.

6. A method of controlling a message composition interface on a communication device, said method comprising:
presenting a message composition interface for creating a being-composed message;
populating fields of said message composition interface based on user input;
recognizing a Short Messaging Service (SMS) destination address in an addressing field of said message composition interface;
determining whether a device associated with said SMS destination address is capable of concatenating multiple SMS message payloads;
during composition of said being-composed message, displaying a marker in said message composition interface to indicate a point in said being-composed message at which a character limit has been met if said device associated with said SMS destination address is incapable of said concatenating;
displaying another marker in a text field to indicate another point in said being-composed message at which a further character limit has been met such that text between said marker and said another marker will be sent as one SMS message payload;
permitting editing of said being-composed message while displaying said marker; and
transmitting said being-composed message as a macro SMS message where the device associated with said SMS destination address is capable of said concatenating, or, as multiple SMS message payloads where the device associated with said SMS destination address is not capable of said concatenating.

7. The method of claim 6 further comprising including contents of a subject field associated with said message in first and second SMS message payloads of said multiple SMS message payloads.

8. The method of claim 6 wherein said determining comprises consulting an entry associated with said SMS destination address in a contact management application on said communication device, said entry indicating whether a device associated with said SMS destination address is capable of concatenating multiple SMS message payloads.

9. The method of claim 6 further comprising formulating a first SMS message based on a first SMS message payload of said multiple SMS message payloads and said SMS destination address and formulating a second SMS message based on a second SMS message payload of said multiple SMS message payloads and said SMS destination address.

10. The method of claim 9 further comprising transmitting said first and said second SMS messages on a wireless network.

* * * * *